United States Patent Office 3,149,933
Patented Sept. 22, 1964

3,149,933
PROCESS FOR STABILIZING LIQUID FUELS
Kurt Ley, Leverkusen, Helmut Freytag, Cologne-Stammheim, Ernst Roos, Cologne-Flittard, and Walther Lohmar, Leverkusen, Germany, assignors to Farbenfabriken Bayer Aktiengesellschaft, Leverkusen, Germany, a corporation of Germany
No Drawing. Filed Aug. 1, 1961, Ser. No. 128,356
Claims priority, application Germany Aug. 25, 1960
2 Claims. (Cl. 44—75)

It is known that the action of oxygen on liquid fuels causes formation of oxygen-containing compounds which impair the quality of the liquid fuels.

In order to reduce this action of the oxygen, it has already been proposed to add substituted phenols or p-phenylene diamines substituted on the nitrogen atom with alkyl radicals.

Whereas the efficiency of the phenols, which have good solubility in liquid fuels, is not entirely satisfactory, strong discoloration occurs with the highly effective p-phenylene diamines. In addition, the solubility of the p-phenylene diamines in the benzines is in many cases too low.

It has now been found that compounds of the formula

[Formula 1: benzene ring with OH, $R_1$, $R_3$, $R_4$, and $N-R_2$ substituents]

Formula 1 are very suitable as stabilizers for liquid fuels.

In the above formula, $R_1$ and $R_2$ stand for hydrocarbon radicals with up to 16 carbon atoms. $R_1$ also stands for hydrogen and $R_2$ for a radical of the formula

[Formula 2 and Formula 3 structures with $R_5$, $R_6$, $R_7$, $R_8$, $R_9$ substituents]

Formula 2      Formula 3 in which $R_3$, $R_4$, $R_8$ and $R_9$ stand for hydrocarbon radicals with 4–9 carbon atoms, the carbon atom adjacent to the aromatic ring being only substituted by hydrocarbon radicals, and the radicals $R_5$, $R_6$ and $R_7$ stand for hydrogen or hydrocarbon radicals with up to 16 carbon atoms.

The compounds used according to the invention have on the one hand the high solubility of the phenols in benzines and on the other hand, the efficacy thereof approaches and sometimes even exceeds that of the p-phenylene diamines, without the disadvantageous discoloration occurring.

Examples of the compounds used according to the invention are:

2-methylamino-4,6-di-tert.-butylphenol
2-ethylamino-4,6-di-tert.-butylphenol
2-n-propylamino-4,6-di-tert.-butylphenol
2-iso-propylamino-4,6-di-tert.-butylphenol
2-sec.-butylamino-4,6-di-tert.-butylphenol
2-dodecylamino-4,6-di-tert.-butylphenol
2-cyclohexylamino-4,6-di-tert.-butylphenol
2-o-methylphenylamino-4,6-di-tert.-butylphenol
N,N'-bis-2-hydroxy-3,5-di-tert.-butyl-phenyl-1,3-phenylene diamine
2-methylamino-4,6-di-(methylcyclohexyl)-phenol
N,N'-methylene-bis-(2-tert.-butylamino-4,6-di-tert.-butyl-phenol)
N,N'-methylene-bis-(2-n-propylamino-4,6-di-tert.-butyl-phenol)
2-phenylamino-4,6-di-tert.-butyl-phenol
2-N-methyl-N-phenylamino-4,6-di-tert.-butyl-phenol
N,N'-methylene-bis-[4,6-di-tert.-butyl-2-(N-ethyl)]-aminophenol
N,N'-methylene-bis-[4,6-di-tert.-butyl-2-(N-n-propyl)]-aminophenol
N,N'-methylene-bis-[4,6-di-tert.-butyl-2-(N-tert.-butyl)]-aminophenol
N,N'-methylene-bis-[4,6-di-tert.-butyl-2-(N-isobutyl)]-aminophenol
N,N'-methylene-bis-[4,6-di-tert.-butyl-2-(N-cyclohexyl)]-aminophenol
N,N'-methylene-bis-[4,6-α-methylcyclohexyl-2-(N-cyclohexyl)]-aminophenol
N,N'-methylene-bis-[4,6-α-methylcyclohexyl-2-(N-ethyl)]-aminophenol
N,N'-methylene-bis-[4,6-α-methylcyclohexyl-2-(N-methyl)]-aminophenol
2-(N-p-tolyl-N-methyl)-amino-4,6-di-tert.-butyl-phenol
2-(N-o-tolyl-N-methyl)-amino-4,6-di-tert.-butyl-phenol
2-(N-p-anisyl-N-methyl)-amino-4,6-di-tert.-butyl-phenol
2-(N-o-anisyl-N-methyl)-amino-4,6-di-tert.-butyl-phenol The compounds used for the new process can be obtained by 1,2-dihydroxy benzenes, which are substituted in the 4-position and 6-position by the radicals $R_3$, $R_4$, $R_8$ and $R_9$ referred to in the above formula, being reacted with primary amines in the presence of oxygen, for example atmospheric oxygen. If $R_2$ is to stand for a radical of the Formula 2, the reaction products obtained are further reacted with formaldehyde or ketones.

Examples of the suitably substituted 1,2-dihydroxybenzenes are 4,6-di-tert.-butyl pyrocatechol, 4,6-di-α-methylcyclohexyl pyrocatechol, 4,6-di-tert.-amyl pyrocatechol, 4,6-di-tert.-octyl pyrocatechol, 4,6-di-tert.-dodecyl pyrocatechol, 6-tert.-butyl-4-tert.-amyl pyrocatechol and 4-tert.-octyl-6-tert.-butyl pyrocatechol.

Examples of the primary amines are saturated or unsaturated aliphatic, cycloaliphatic or aromatic amines, such as methylamine, ethylamine, n-propylamine, n-butylamine, sec.-butylamine, tert.-butylamine, allyl amine, cyclohexylamine, aniline, 4-methylaniline, 2-methylaniline, 3-methylaniline, 3,5-dimethylaniline, 4-ethylaniline and m-phenylamine diamine.

If an aryl amine is used for the reaction, it is advisable to work in the presence of secondary or tertiary aliphatic amines or alkali hydroxides.

The compounds used according to the invention are generally clear, viscous liquds of low volatility or solid crystalline compounds having a weak aromatic odour.

The influence of the aforementioned compounds on the storability of fuels for Otto engines was tested:

(a) By determining the resistance to oxidation of a liquid fuel according to DIN 51,780, without and with addition of the oxidation inhibitors, (b) By determining the resins (of the existent gum or potential gum) according to ASTM D381–49 before and after the artificial ageing in accordance with DIN 51,780.

For the experiments, a liquid fuel was used which had been prepared from 90% by volume of a thermally cracked benzene with 10% by volume of cyclohexane, and which was exceptionally unstable in storage, as shown by the following tables.

Examples 1 and 2 show the strongly inhibiting action of the compounds, both on the stability in storage and also the reduction in the new resin formation (potential gum) in the liquid fuel mixture.

The examples show that some of the compounds used in accordance with the invention have an action approaching that of the much used inhibitor of the type of N-isopropyl-N'-phenyl-p-phenylenediamine or dicyclohexyl-p-phenylene diamine and some are even superior thereto, without having the frequently disadvantageous discolouring effect. The new products are in all cases superior in their action to the 2,6-di-tert.-butyl-4-methyl-phenol which is much used as an inhibitor.

*Example 1*

| Specimen used (Liquid fuel + added compound) | Percent by weight | Induction time according to DIN 51,780 in min. | Gum according to ASTM 381, 49 mg./100 cc. | |
|---|---|---|---|---|
| | | | Existent | Potential |
| Liquid fuel (blank value) | | 90 | 1.6 | 407.6 |
| + dicyclohexyl-p-phenylene diamine (comparison) | 0.010 | 240 | 2.4 | 3.2 |
| + N-isopropyl-N'-phenyl-p-phenylene diamine (comparison) | 0.010 | 240 | 1.4 | 3.6 |
| + 2-n-butylamino-4,6-di-tert.-butylphenol | 0.010 | 240 | 3.0 | 4.4 |
| + N,N'-methylene-bis-4,6-di-tert.-butyl-2-(N-n-butyl)-aminophenol | 0.010 | 240 | 1.4 | 2.0 |

The 2-n-butylamino-4,6-di-tert.-butyl-phenol was obtained in the following manner:

66.6 g. of 4,6-di-tert.-butyl-pyrocatechol are suspended in 450 ml. of light benzine and 21.3 g. of n-butylamine are added thereto. Complete dissolution immediately occurs with formation of a blue colouring. After drying the reacting mixture with anhydrous $Na_2SO_4$ and distilling off the solvent the remainder distills over from 184–189° C./18 mm.

Yield: 71.5 g.=84.5% of the theoretical. The distillate slowly solidifies overnight. Melting point (hydrochloride, once from gasoline), 176–177.5° C.

The N,N'-bis-2-hydroxy-3,5-di-tert.-butyl-phenyl-1,3-phenylene diamine was obtained in the following manner:

66.6 g. of 4,6-di-tert.-butyl pyrocatechol are dissolved in 300 cc. of benzene and 6 g. of triethylamine are added thereto. 16.2 g. of freshly distilled 1,3-phenylene diamine are then added, whereafter the mixture is stirred for 5 hours, left to stand overnight and then the reaction product is filtered off with suction. The compound washed with methanol and thereafter with gasoline melts at a temperature from 241–241.5° C.

*Example 2*

| Specimen used (Liquid fuel + added compound) | Percent by weight | Induction time according to DIN 51,780 in min. | Gum according to ASTM D 381, 49 mg./100 cc. | |
|---|---|---|---|---|
| | | | Existent | Potential |
| Liquid fuel (blank value) | | 90 | 1.6 | 407.6 |
| + dicyclohexyl-p-phenylene diamine (for comparison) | 0.002 | 240 | 3.6 | 3.2 |
| + N-isopropyl-N'-phenyl-p-phenylene diamine (for comparison) | 0.002 | 240 | 1.2 | 5.2 |
| + 2,6-di-tert.-butyl-4-methyl-phenol (for comparison) | 0.002 | 180 | 1.6 | 39.0 |
| + N-p-tolylamino-4,6-dimethylcyclohexyl phenol | 0.002 | 240 | 2.6 | 4.4 |
| + N,N'-bis-2-hydroxy-3,5-di-tert.-butylphenyl-1,3-phenylene diamine | 0.002 | 240 | 4.0 | 3.6 |
| + N,N'-methylene-bis-4,6-di-tert.-butyl-2-(N-n-butyl)-amino phenol | 0.002 | 240 | 0.6 | 2.0 |

We claim:
1. Gasoline fuel containing, in an amount sufficient to stabilize the fuel, N,N'-methylene-bis-4,6-di-tert.-butyl-2-(N-n-butyl)-amino phenol.
2. Gasoline fuel containing, in an amount sufficient to stabilize the fuel N,N'-bis-2-hydroxy-3,5-di-tert.-butyl phenyl-1,3-phenylene diamine.

References Cited in the file of this patent

UNITED STATES PATENTS

| | | |
|---|---|---|
| 2,275,311 | Pedersen et al. | Mar. 3, 1942 |
| 2,336,006 | Fuller | Dec. 7, 1943 |
| 2,348,638 | Mikeska et al. | May 9, 1944 |
| 2,459,112 | Oberright | Jan. 11, 1949 |
| 2,504,742 | Smith et al. | Apr. 18, 1950 |
| 2,707,173 | Cantrell et al. | Apr. 26, 1955 |
| 2,985,523 | Chamot | May 23, 1961 |